A. SHEPARD,

Assignor to THE PECK, STOW & WILCOX CO.

Coffee and Spice Mill.

No. 8,866. Reissued Aug. 19, 1879.

Witnesses.

H. B. Thomson.

S. S. Burr

Inventor.

Amos Shepard

By James Shepard Atty.

UNITED STATES PATENT OFFICE.

AMOS SHEPARD, OF PLANTSVILLE, ASSIGNOR TO THE PECK, STOW & WILCOX COMPANY, OF SOUTHINGTON, CONNECTICUT.

IMPROVEMENT IN COFFEE AND SPICE MILLS.

Specification forming part of Letters Patent No. 206,141, dated July 16, 1878; Reissue No. 8,866, dated August 19, 1879; application filed June 19, 1879.

*To all whom it may concern:*

Be it known that I, AMOS SHEPARD, of Plantsville, in the county of Hartford and State of Connecticut, have invented certain new and useful Improvements in Coffee or Spice Mills, of which the following is a specification.

My invention relates particularly to that style of box mills which have the bulk of the hopper located below the box-top, for convenience of attaching and operating a suitable cover at the upper edge or mouth of the hopper for closing it, such hoppers in box mills being known as "sunk hoppers;" and the invention consists, first, in the combination of the box-top and hopper with the cover and other parts, as hereinafter described; and, second, in the peculiar construction and manner of combining the cross-bar and hopper, as hereinafter described.

Figure 1:
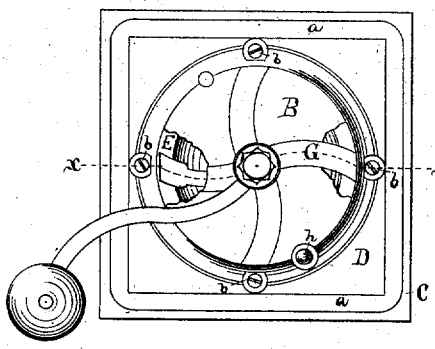
Figure 2:
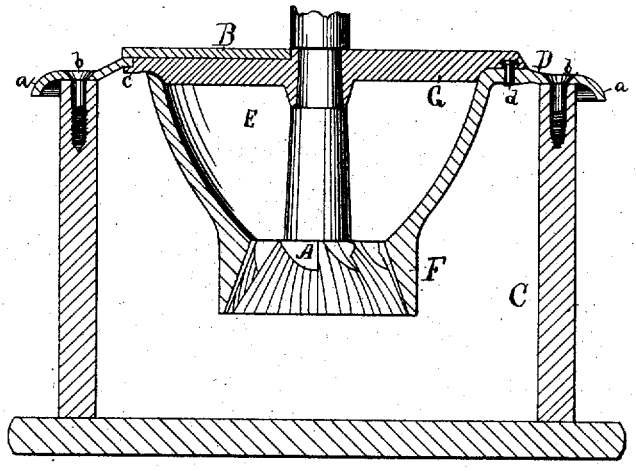

In the accompanying drawings, Figure 1 is a plan or top view of a mill which embodies my invention, the same being represented with the cover partially broken away, in order to better show the other parts; and Fig. 2 is a vertical section of the same, partly in elevation, the latter figure being represented on a scale twice as large as the scale employed for Fig. 1.

The adjusting device, grinding-nut A, and swinging cover B are substantially the same as shown in my Patent No. 186,889, dated January 30, 1877.

The box C, with the exception of its top, is the same as those now in common use. D designates the metal box-top, formed with a flat seat upon its under side to fit the top edge of the wooden box C, outside of which seat the top drops downward and outward, forming a depending rim, *a*. Directly over the flat seat and the sides of the box C are screw-holes, through which screws *b b b b* are passed to secure the top and box together.

In the middle of the top D the metal is deflected, first slightly upward, and then downward, to form the hopper E, at the lower end of which, and of the same piece of metal, is the grinding-shell F.

It will be seen that by this construction the top D constitutes an outwardly-projecting flange at the upper edge of the hopper, which may be cast in one and the same piece with it, the whole producing a combined metal box-top and hopper, in which the bulk of the hopper is below the box-top, while at its upper edge there is an elevated rim, which projects above the surrounding flange and forms an elevated annular seat for the cover to swing on, said cover being hinged or pivoted thereto by means of a suitable pin or pivot, *h*, as shown in Fig. 1.

Extending across the top of the hopper E is the cross-bar G, in which is the bearing for the shaft of the grinding-nut A. At the top edge of the hopper there is a recess, one on each side, that upon one side being shallow, with a rivet-hole through the metal under it, and that upon the other side being deeper, so that it extends through the metal at the point of its greatest upward deflection. The recesses are of such form as to fit and receive the projections on the ends of the cross-bar, which are thinner than the body of said bar, whereby shoulders are formed which engage the inside of the hopper, as shown. The end which rests in the deepest recess is offset to form the hook or projection *c*, and the other end is provided with a pin or rivet, *d*, preferably cast in. If desired, a screw might be substituted for this rivet *d*.

The cross-bar is inserted and secured by first passing the hook *c* through the deep or open recess (shown at the left in Fig. 2) and under the metal in the box-top D, so as to hold that end in place. The other end is then dropped into its recess, and the rivet *d* is passed through the hole made to receive it, when its end is headed, and the cross-bar is rigidly held in place in a very cheap, simple, and efficient manner.

By making the combined box-top and hopper of the form and as described the entire grinding mechanism, together with the box-top and hopper-cover, can be set up, fitted, and finished wholly independent of the wooden box, whereby the box is not soiled in setting up; neither is any extra labor or caution necessary in order to prevent soiling the wooden box, as the metal box-top, hopper, cover, and grinding mechanism, which constitute the mill proper, can be put together, fitted, and finished in one room by one set of hands, and then attached to the box proper in another and cleaner room by another set of hands.

Thus it will be seen that both the box and the grinding mechanism, with box-top, sunk hopper, and cover attached, may be properly finished before securing the latter parts to the box, so that merely securing the box-top to the box produces a neatly-finished box mill with sunk hopper and cover complete without any subsequent operation, which mill is stronger and more durable than prior ones of the same class, and at the same time it can be produced at a reduced cost.

I am aware that a box mill with a wooden hopper made in several pieces and glued to the under side of a wooden box-top, is old, and I hereby disclaim such a mill.

I am also aware that box mills have been made with a metal box-top and an uncovered and elevated hopper secured to the upper side of and above said iron top, and I hereby disclaim the same.

I claim as my invention—

1. In a box mill, a metal hopper and flange, said flange projecting laterally at or near the top of the hopper, so as to form the cover of and means of attachment to the wooden box, in combination with a hinged hopper-cover and grinding mechanism, substantially as and for the purpose set forth.

2. In a coffee or spice mill, the combination of the following elements—viz: first, the hopper formed with an outwardly-turned flange or box-top at its upper edge, and provided with recesses on two opposite sides; second, the cross-bar provided with projections at each end, and at one end with the hook *c*, which takes under the outwardly-turned flange of the hopper; and, third, a single screw or rivet which takes into the flange of the hopper at the end of the cross-bar which is opposite the hook, substantially as described, and for the purpose specified.

AMOS SHEPARD.

Witnesses:
C. W. WOLCOTT,
M. H. HOLCOMB.